United States Patent [19]

Arndt

[11] Patent Number: 5,803,222

[45] Date of Patent: Sep. 8, 1998

[54] TORQUE TRANSMITTING FRICTION MECHANISM WITH A PLATE HAVING A REACTION TAB

[75] Inventor: Randal William Arndt, Belleville, Mich.

[73] Assignee: General Motors Corporation, Detroit, Mich.

[21] Appl. No.: 810,967

[22] Filed: Feb. 27, 1997

[51] Int. Cl.⁶ ..................................................... F16D 13/52
[52] U.S. Cl. ............................... 192/70.2; 192/85 AA
[58] Field of Search ........................... 192/70.11, 70.19, 192/70.2, 85 AA, 58.41

[56] References Cited

U.S. PATENT DOCUMENTS

| | | | |
|---|---|---|---|
| 3,191,735 | 6/1965 | Wavak | 192/70.2 X |
| 4,071,127 | 1/1978 | Suzuki | 192/70.2 X |
| 4,425,994 | 1/1984 | Schele | 192/70.2 X |
| 5,054,596 | 10/1991 | Taureg et al. | 192/70.2 X |

*Primary Examiner*—Rodney H. Bonck
*Assistant Examiner*—Saúl Rodríquez
*Attorney, Agent, or Firm*—Donald F. Scherer

[57] ABSTRACT

A friction torque transmitting mechanism has a plurality of reaction plates interleaved with a plurality of friction drive plates. The reaction plates are brought into frictional contact with the drive plates by a fluid operated piston, such that a transfer of torque can be conducted through the frictional engagement of the plates. The reaction plates have a reaction portion disposed in a slot in a housing. One of the reaction plates has an axially extending reaction tab positioned between the reaction portions of the remaining plates and the sidewall of the slot. The reaction forces on the reaction portions are transmitted to the sidewall through the reaction tab.

4 Claims, 3 Drawing Sheets

TORQUE TRANSMITTING FRICTION MECHANISM WITH A PLATE HAVING A REACTION TAB

TECHNICAL FIELD

This invention relates to torque transmitting friction mechanisms.

BACKGROUND OF THE INVENTION

Friction torque transmitting mechanisms have a plurality of reaction plate members each having tab or teeth disposed in slots in a housing. Friction drive plates are interspersed with the reaction plates and are splined at an inner diameter thereof to a hub. Generally, the reaction plates are steel, the housing is aluminum, the hub is steel and the friction plates are steel with an annular friction material bonded thereto. The steel reaction plates, being harder than the aluminum housing, can cause "peening" or cutting of the housing. To reduce the peening, the reaction plates must have sufficient thickness or the reaction torque at each plate must be maintained at a low level by increasing the number of plates. This requires an increase in axial length of the transmission to accommodate the necessary friction surfaces.

SUMMARY OF THE INVENTION

It is an object of the present to provide an improved friction torque transmitting mechanism having a reaction plate with an extended reaction surface.

In one aspect of the invention, a friction torque transmitting device has a housing with at least one reaction slot formed therein. A plurality of reaction plates each have at least one reaction tooth or lug disposed in the slot. One of the reaction plates has an elongated reaction tab member extending axially from the reaction tooth between a sidewall of the slot and the other reaction teeth. All of the reaction forces transmitted from the reaction teeth to the housing are transmitted through the reaction tab which is the same material as the reaction teeth thereby reducing the peening effect and spreading the reaction load over the area of the reaction tab.

In another aspect of the invention, the one reaction tooth has reaction tabs extending axially from opposite sides of the reaction tooth along spaced sidewalls of the slot in which the teeth are disposed.

The space normally occupied by the engine and transmission is becoming more crowded as more accessories and smaller compartments are utilized. The axial length of the transmission, particularly in transverse powertrains, is important. In order to reduce the axial length, the clutch and brake friction and reaction plates are made thinner. This increases the compression stress between the reaction plates and the housing because of the thinner reaction lugs or teeth on the plate. The present invention accommodates the higher compression stresses by spreading the reaction load over the entire tab length and thereby protecting the aluminum housing from the peening action.

DESCRIPTION OF AN EXEMPLARY EMBODIMENT

Figure 1:
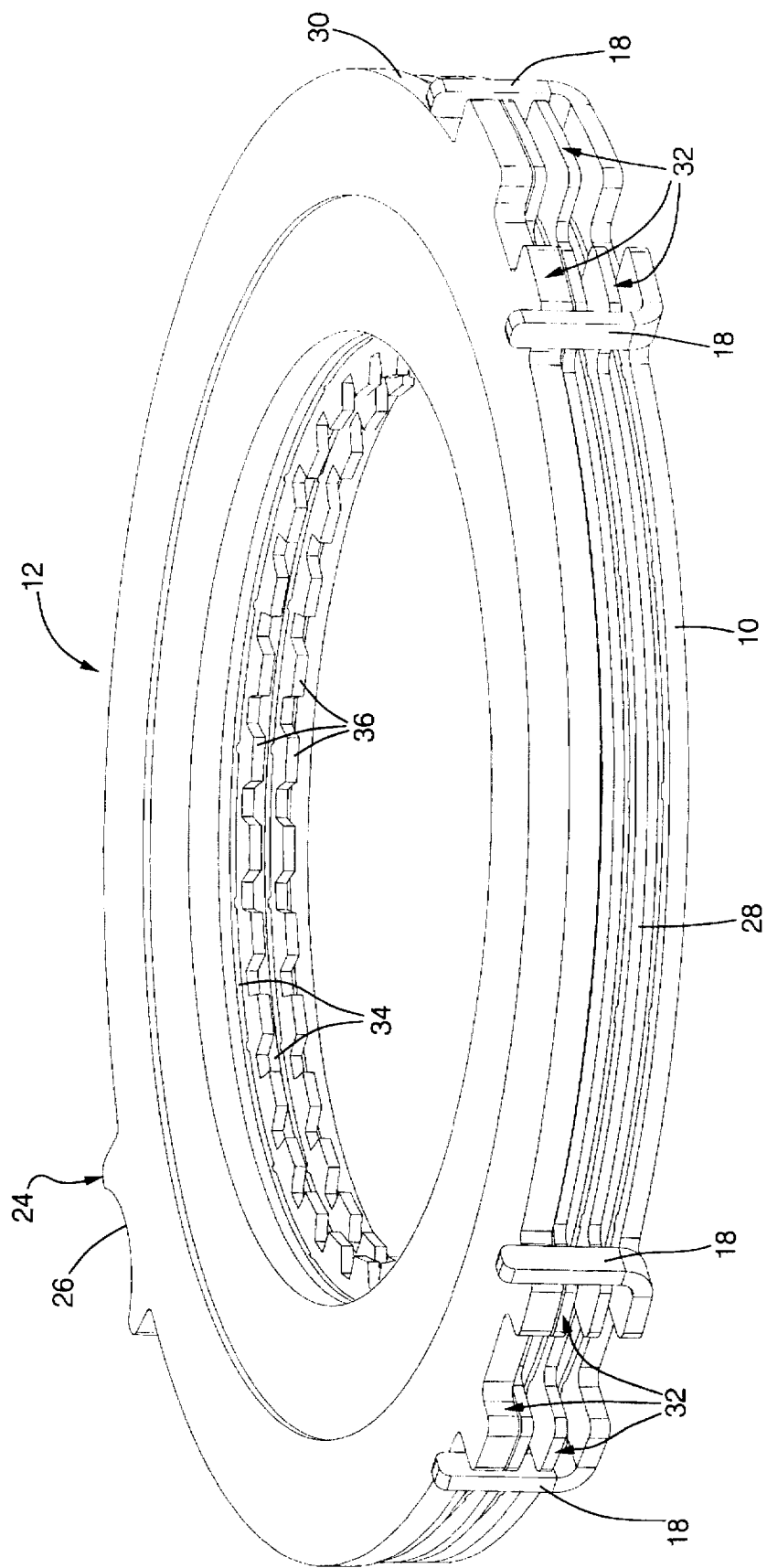
FIG. 1 is an isometric view of a friction pack assembly incorporating the present invention.
Figure 4:
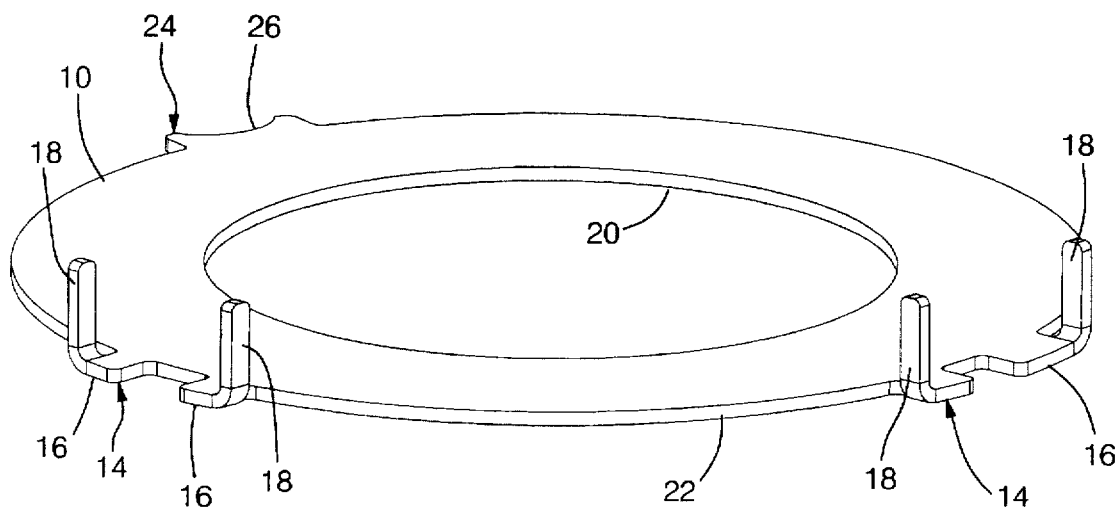
FIG. 4 is an isometric view of a reaction plate incorporated in the present invention.

Referring to the drawings, wherein like characters represent the same or corresponding parts throughout the several views, there is seen particularly in FIGS. 1 and 4, a reaction plate 10 which may be utilized with a friction pack 12, shown in FIG. 1. The reaction plate 10 has a pair of spaced tooth-like reaction tangs or lugs 14, each of which is comprised of spaced tooth portions 16. The tooth portions 16 each have extending therefrom a reaction tab 18. The reaction tabs 18 extend axially relative to the plate 10.

Figure 2:
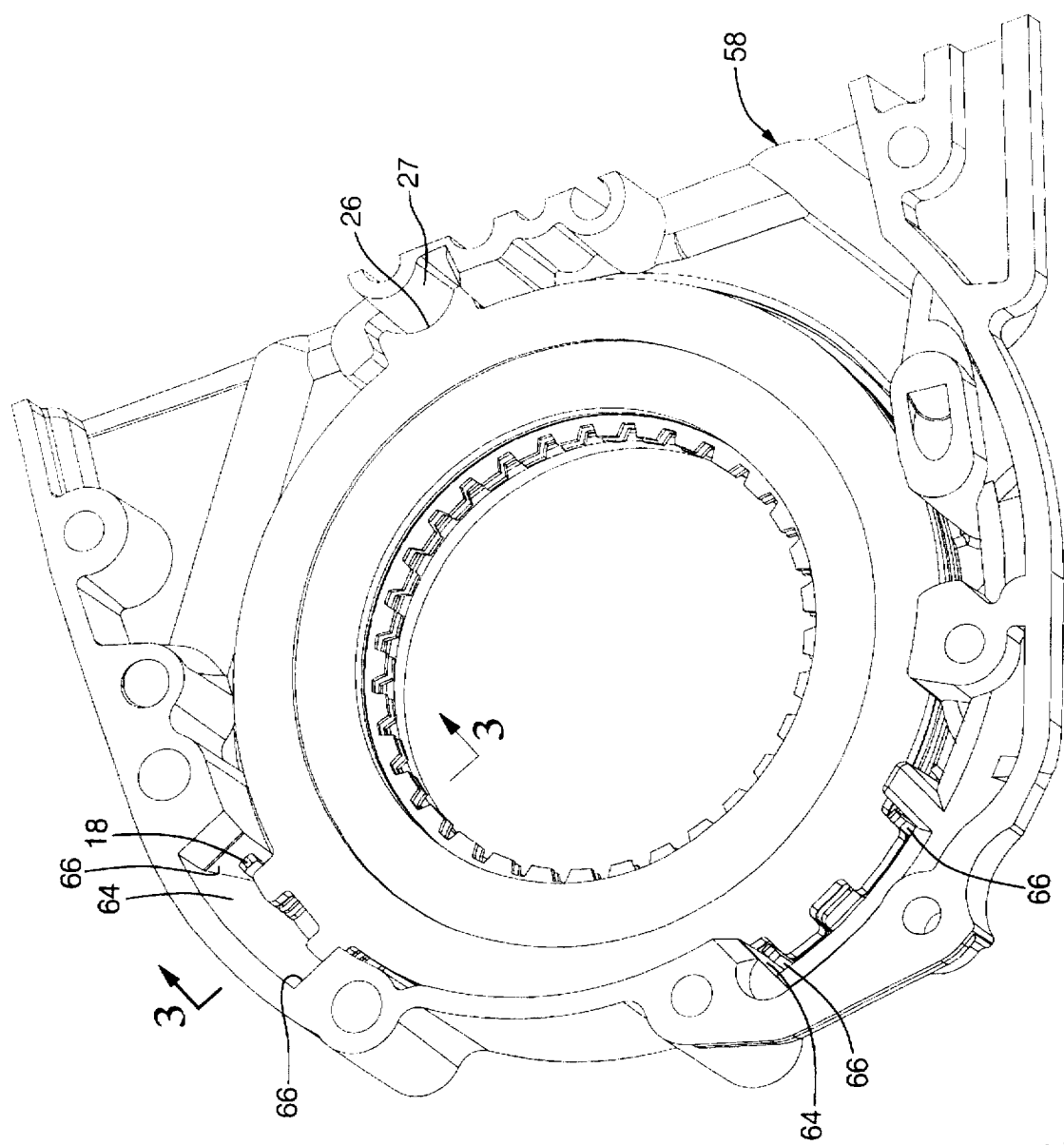
FIG. 2 is an isometric view of the friction pact assembly installed in a housing.

In general form, the plate 10 is an annulus having an inner diameter 20 and an outer diameter or surface 22. The tangs 14 are disposed on the outer surface 22. Also formed on the outer surface 22 is an alignment portion 24 which has a central slot 26 which, as best seen in FIG. 2, is aligned on an alignment post 27.

As seen in FIG. 1, the friction pack 12 also includes a plurality of reaction plates 28 and a backing plate 30, each of which have tooth-like reaction tangs or lugs 32. The backing plate 30 is manufactured of thicker material than the reaction plates 28 since the backing plate 30 is the outer reaction point or surface for the friction mechanism comprised of the friction pack 12. The tangs 32 of the backing plate 30 and reaction plates 28 are disposed between the spaced reaction tabs 18 of the reaction plate 10.

Figure 3:
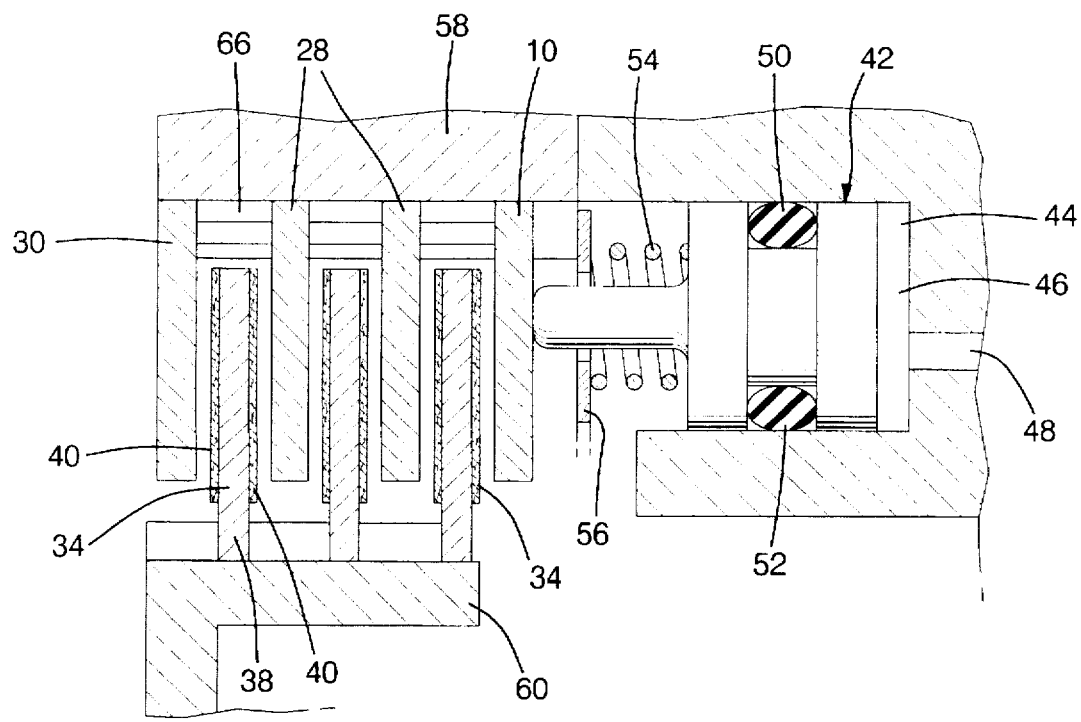
FIG. 3 is a view taken along line 3—3 of FIG. 2.

Header spurs between the reaction plates 10 and 28 are friction drive plates 34, each of which have a drive spline 36. The friction drive plates 34, as best seen in FIG. 3, have a steel core 38 to which is mounted an annular friction surface 40 on each outer surface thereof. The friction plate 34 presents a pair of friction surfaces to adjacent reaction plates 10 and 28 and backing plate 30. Thus, the pack 12, as seen in FIGS. 1 and 3, provides a friction transmitting mechanism.

To engage the friction transmitting mechanism, that is to bring the reaction plates into frictional abutment with the drive plates, a fluid operated piston 42 is provided. Preferably, the piston 42 is annular and is disposed in a chamber 44 so as to cooperate therewith to provide an apply chamber 46 to which fluid pressure is admitted through a passage 48. The piston 42 has incorporated therewith a pair of annular O-rings 50 and 52 which serve to provide the substantially tight seal between the chamber 46 and the atmosphere. The piston 42 is urged rightward, as seen in FIG. 3, by a plurality of springs, such as 54, which are compressed between the piston 42 and a spring retainer plate 56 which is preferably annular in shape.

When fluid pressure is admitted to the chamber 46 at sufficient levels, the piston 42 will move leftward urging the plates 10 and 28 into frictional abutment with the plates 34, such that frictional torque transmission will occur between a transmission housing 58 and a drive hub 60. The drive hub 60 is connected in a conventional manner to a gear member or shaft. The housing 58 may be stationary, as shown in FIG. 2, or maybe a cast rotary housing of the rotating clutch type. Both of these housing assemblies are familiar to those skilled in the art.

In the embodiment shown, the housing 58 has a pair of spaced recesses 64, each of which have a pair of sidewalls 66. The friction pack 12 is disposed in the housing, such that the reaction tabs 18 extend parallel with the sidewalls 66. Thus, the reaction tab 18 is positioned between the reaction lugs 32 and the sidewalls 66. The housing 58 is preferably formed of aluminum, which is, of course, a lightweight material and is utilized the overall vehicle weight thereby increasing overall drive efficiency. However, the friction pack 12 is formed of steel plates which have a much harder surface than the aluminum. The reaction force transmitted by the tangs or lugs 32 is imposed on the reaction tabs 18 which, in turn, transmits the reaction load to the housing 58. The reaction tabs 18 having a much larger surface area than the individual reaction lugs 14 and 32, thereby reducing the amount of reaction stress which the housing 58 must absorb.

As is well known, the stress is the reaction force provided by the reaction area. Therefore, increasing the area, as is done with the reaction tabs 18, the reaction stress is greatly reduced. This maintains the stress level at the sidewalls 66 of the aluminum surface below a stress at which the surface will be peened or cut into by the reaction lugs 32 if they were to contact the sidewalls 66 without the intervention of the reaction tab surfaces 18.

To assist in assembling the friction pack 12 in the housing 58, the alignment post 27 is provided along with the recesses 64. Thus, the friction pact 12 has at least three points of alignment during assembly and the alignment post 68 will basically assure that the centerline of the drive splines 36 is proper for the installation of the hub 60.

During installation within the housing 58, the piston and reaction springs and reaction plate can be installed into a chamber in the housing 58 prior to the installation of the friction pack 12 or the friction pack 12 can be installed in one portion of the housing and the piston assembly installed in another portion. These two portions are then mated and secured together by fasteners, such as bolts.

The side or face of the friction pack 12 at which the backing plate 30 is presented, it can be closed with another housing portion which would be bolted or otherwise fastened to the housing 58. In the alternative, locking rings can be utilized to secure the backing plate 30 within the housing 58. This would be the normal assembly process if the housing was a rotating clutch housing.

I claim:

1. A friction torque transmitting mechanism comprising:

a housing including a slot with sidewalls formed therein;

a plurality of first friction plates disposed in said housing, each having a radially extending tang formed on an outer periphery thereof and disposed in said slot, one of said first friction plates having a tab formed integral with said tang and extending axially between said tangs on the other first friction plates and one of said sidewalls of said slots;

at least one second friction plate disposed axially between adjacent ones of said first plates for selective frictional engagement therebetween; and a piston slidably disposed in said housing axially adjacent one of said first friction plates for selective abutment therewith to enforce frictional engagement between said first and second friction plates.

2. The friction torque transmitting mechanism defined in claim 1 wherein a torque is applied to said second friction plates during the frictional engagement and the tab on said one of said first plates is urged into abutment with said one sidewall by said torque.

3. The friction torque transmitting mechanism defined in claim 2 further wherein said tangs on the other of said first plates are urged into abutment with said tab by said torque.

4. A friction torque transmitting mechanism comprising:

a housing including a plurality of slots with each having a pair of sidewalls formed therein;

a plurality of first friction plates disposed in said housing, each having a plurality of radially extending tangs formed on an outer periphery thereof and disposed in respective ones of said slot, one of said first friction plates having a pair of tabs formed integral with each of said tangs and extending axially between said tangs on the other first friction plates and respective ones of said sidewalls of said slots;

at least one second friction plate disposed axially between adjacent ones of said first plates for selective frictional engagement therebetween; and a piston slidably disposed in said housing axially adjacent one of said first friction plates for selective abutment therewith to enforce frictional engagement between said first and second friction plates;

said first friction plates being rotationally displaced by torque transmission during frictional engagement to enforce abutment between said tangs and respective ones of said tabs and between said respective tabs and respective ones of said sidewalls.

* * * * *